(12) United States Patent
Sugita (10) Patent No.: US 8,000,026 B2
(45) Date of Patent: Aug. 16, 2011

(54) OPTICAL SYSTEM AND OPTICAL APPARATUS HAVING THE SAME

(75) Inventor: Shigenobu Sugita, Shimotsuke (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/904,727

(22) Filed: Oct. 14, 2010

(65) Prior Publication Data

US 2011/0090576 A1    Apr. 21, 2011

(30) Foreign Application Priority Data

Oct. 16, 2009   (JP) .................. 2009-239163

(51) Int. Cl.
*G02B 15/14* (2006.01)

(52) U.S. Cl. ....................... 359/692; 359/691

(58) Field of Classification Search .......... 359/691, 359/692, 686–689
See application file for complete search history.

(56) References Cited

U.S. PATENT DOCUMENTS

| | | | |
|---|---|---|---|
| 6,115,188 A | 9/2000 | Nishio et al. | |
| 6,239,919 B1 | 5/2001 | Sato | |
| 7,253,973 B2 | 8/2007 | Yasui | |
| 7,538,957 B2 | 5/2009 | Endo | |
| 2009/0279184 A1* | 11/2009 | Mihara et al. .............. | 359/692 |

FOREIGN PATENT DOCUMENTS

JP    2008-145584 A    6/2008

OTHER PUBLICATIONS

Extended European Search report issued in corresponding European Patent Application No. 10177870.2 dated Jan. 20, 2011.
Annette Kniffler "Ratgeber: Glas als Werkstoff" XP002612260 Colorfoto, Feb. 15 2008.URL:http://www.colorfoto.de/ratgeber/glasals-werkstoff-372481.html Cited in Extended European Search report issued in corresponding European Patent Application No. 10178308.2 dated Jan. 20, 2011. See NPL cite No. 1. English Translation of N-PK52A shown on p. 2 provided.
"PgF Diagram" Schott Catalouge Jan. 1, 1981. Schott, Mainz, XP002612262. Cited in Extended European Search report issued in corresponding European Patent Application No. 10178308.2 dated Jan. 20, 2011. See NPL cite No. 1.
Schott "Abbe Diagram" XP002612261, Aug. 1, 2010. URL://www.schott.com/advanced_optics/german/download/301576_diagramm-poster_d.pdf> Cited in Extended European Search report issued in corresponding European Patent Application No. 10178308.2 dated Jan. 20, 2011.See NPL cite No. 1.

(Continued)

*Primary Examiner* — Timothy J Thompson
(74) *Attorney, Agent, or Firm* — Rossi, Kimms & McDowell LLP (57) ABSTRACT

An zoom lens includes a front unit having positive refractive power, an aperture stop, and a rear unit. The front unit has a positive lens Gp1 and the rear unit has a negative lens Gn1. When an Abbe number of a material of the positive lens Gp1, and a partial dispersion ratio of the material thereof for a g-line and an F-line is defined as $\nu dp1$ and $\theta gFp1$ respectively, and a refractive index and an Abbe number of a material of the negative lens Gn1 for a d-line, and a partial dispersion ratio of the material thereof for the g-line and the F-line is defined as $Ndn1$ $\nu dn1$ and $\theta gFn1$ respectively, satisfying the following conditions: $75 < \nu dp1 < 99$, $0.020 < \theta gFp1 - 0.6438 + 0.001682 \times \nu dp1 < 0.100$, $1.75 < Ndn1 < 2.10$, and $0.020 < \theta gFn1 - 0.6438 + 0.001682 \times \nu dn1 < 0.100$.

5 Claims, 4 Drawing Sheets

OTHER PUBLICATIONS

Okumura, Tetsuichirou. "Optical System and Optical Device Including the Same," Specification and Drawings of related copending U.S. Appl. No. 12/878,404, filed Sep. 9, 2010, pp. 1-38.

Extended European Search report issued in corresponding European Patent Application No. 10178308.2 dated Jan. 20, 2011, which corresponds to related co-pending U.S. Appl. No. 12/878,404.

* cited by examiner

OPTICAL SYSTEM AND OPTICAL APPARATUS HAVING THE SAME

BACKGROUND OF THE INVENTION

1. Field of the Invention

The present invention relates to an optical system and an optical apparatus having the same, which is suitable for an optical apparatus, such as a silver halide camera, a digital still camera, and a digital video camera.

2. Description of the Related Art

In the related art, as an image taking optical system having the long focal length, there is known an image taking optical system of a telescopic type that has a first lens unit having positive refractive power and a second lens unit having negative refractive power, in which the first lens unit and the second lens unit are provided in order from the object side to the image side.

In a telescopic lens, as the focal length increases, chromatic aberrations, such as a longitudinal chromatic aberration and a lateral chromatic aberration, among various aberrations, are more greatly generated. In general, in order to correct the chromatic aberrations, it is needed to increase both of the entire lens length and the effective diameter of a front unit. For this reason, a challenge of the telescopic lens is to successfully combine high optical performance with portability or convenience at the time of taking an image.

In Japanese Patent Application Laid-Open No. 2008-145584 and U.S. Pat. No. 6,239,919, a positive lens that is formed of a low dispersion material, such as fluorite, having anomalous partial dispersion, is disposed on the front side of a first lens unit where the incident height of an on-axis ray and the incident height of an off-axis principal ray increase to achieve correction of chromatic aberrations and miniaturization of an entire system. In U.S. Pat. No. 7,538,957, a negative lens that is formed of anomalous partial dispersion glass of a low refractive index and low dispersion is disposed on the image surface side of a rear unit where the incident height of an off-axis principal ray is large to achieve correction of chromatic aberrations and miniaturization of an entire system.

In recent years, in a large number of optical apparatuses, an image taking optical system of a telescopic type that satisfactorily corrects various aberrations including a chromatic aberration, is lightweight and compact as a whole and has high optical performance is required.

SUMMARY OF THE INVENTION

Accordingly, it is an object of the invention to provide an optical system that satisfactorily corrects various aberrations including a chromatic aberration and is lightweight and compact as a whole, and an optical apparatus having the same.

An optical system includes a front unit having positive refractive power, an aperture stop, and rear unit having positive or negative refractive power, in order from an object side to an image side, wherein the front unit has a positive lens Gp1 and the rear unit has a negative lens Gn1, and when an Abbe number of a material of the positive lens Gp1 is defined as vdp1, a partial dispersion ratio of the material of the positive lens with respect to a g-line and an F-line is defined as θgFp1, a refractive index and an Abbe number of a material of the negative lens Gn1 with respect to a d-line are defined as Ndn1 and vdn1, respectively, and a partial dispersion ratio of the material of the negative lens with respect to the g-line and the F-line is defined as θgFn1, satisfying the following conditions: 75<vdp1<99, 0.020<θgFp1−0.6438+0.001682×vdp1<0.100, 1.75<Ndn1<2.10 and 0.020<θgFn1−0.6438+0.001682×vdn1<0.100.

Further features of the present invention will become apparent from the following description of exemplary embodiments with reference to the attached drawings.

DESCRIPTION OF THE EMBODIMENTS

Preferred embodiments of the invention will now be described in detail in accordance with the accompanying drawings.

Hereinafter, an optical system (image taking optical system) and an optical apparatus having the same according to the invention will be described. The optical system according to the invention has a front unit LF having positive refractive power, an aperture stop S, and a rear unit LR having positive or negative refractive power, which are provided in this order from the object side to the image side.

Figure 1:
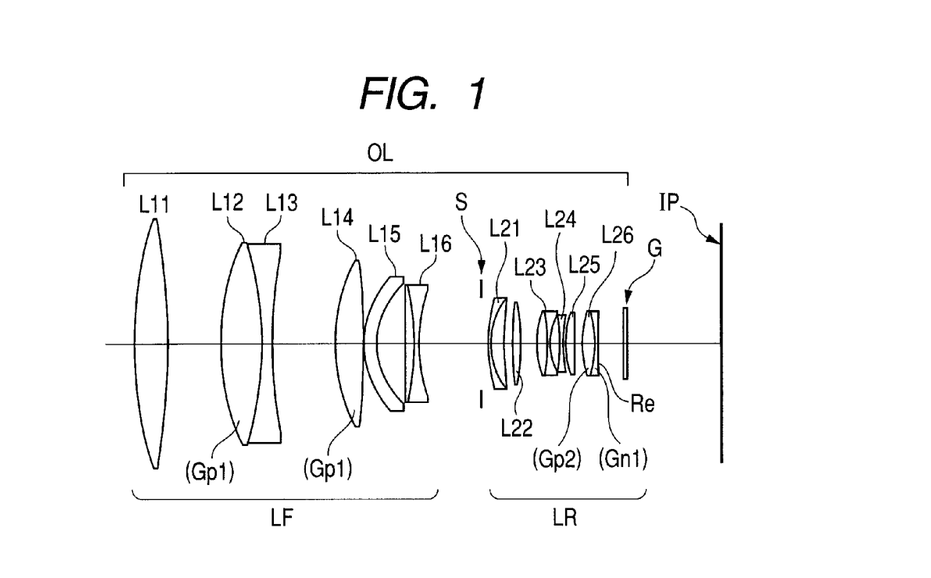
FIG. 1 is a cross-sectional view of a lens according to a first numerical embodiment of the invention.
Figure 2:
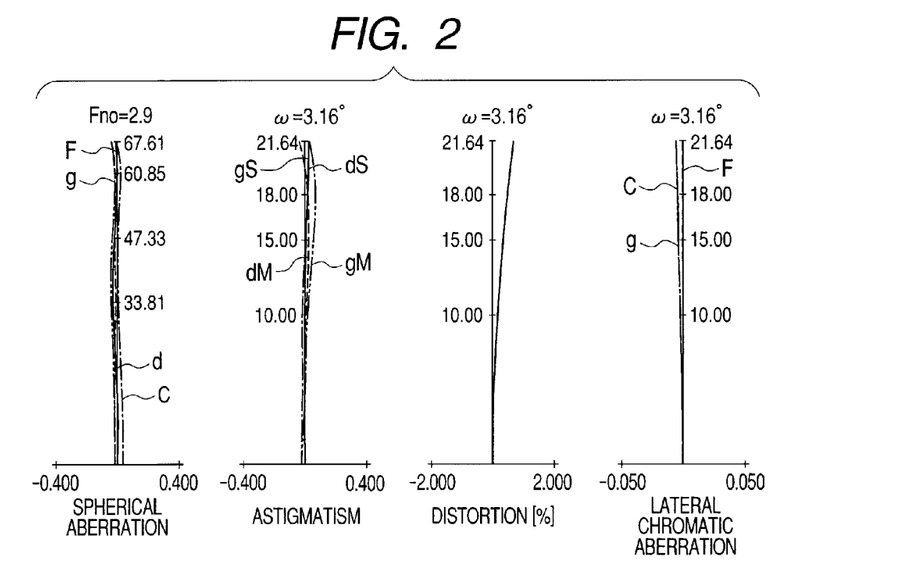
FIG. 2 is a diagram showing aberrations when the object distance is infinite, in the first numerical embodiment of the invention.
Figure 3:
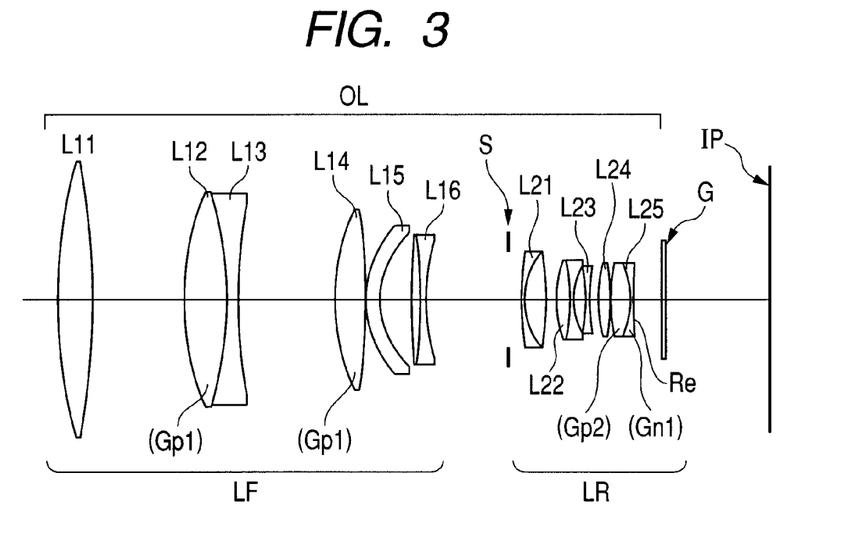
FIG. 3 is a cross-sectional view of a lens according to a second numerical embodiment of the invention.
Figure 4:
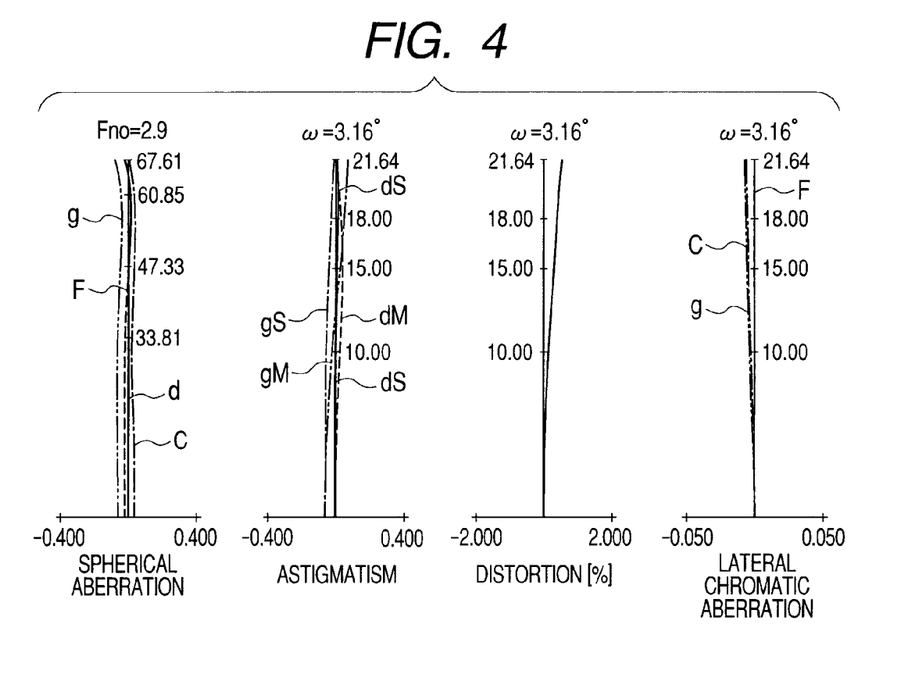
FIG. 4 is a diagram showing aberrations when the object distance is infinite, in the second numerical embodiment of the invention.
Figure 5:
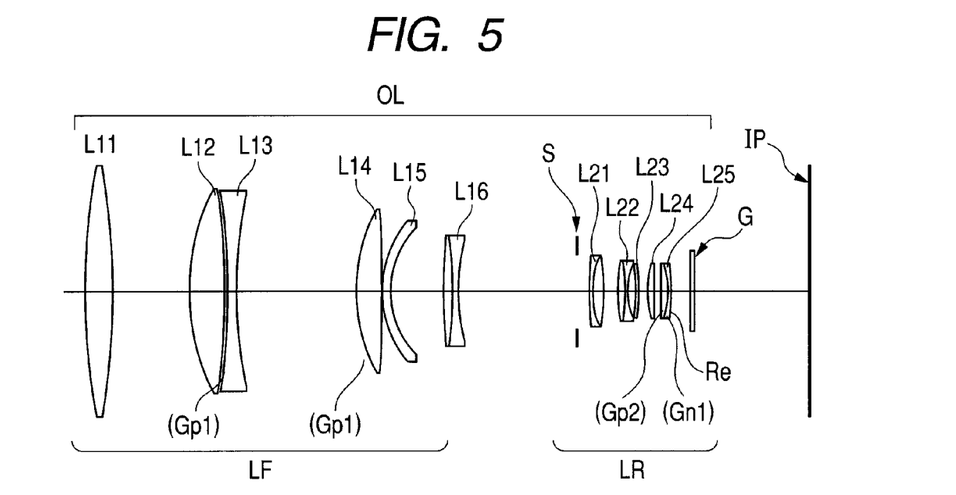
FIG. 5 is a cross-sectional view of a lens according to a third numerical embodiment of the invention.
Figure 6:
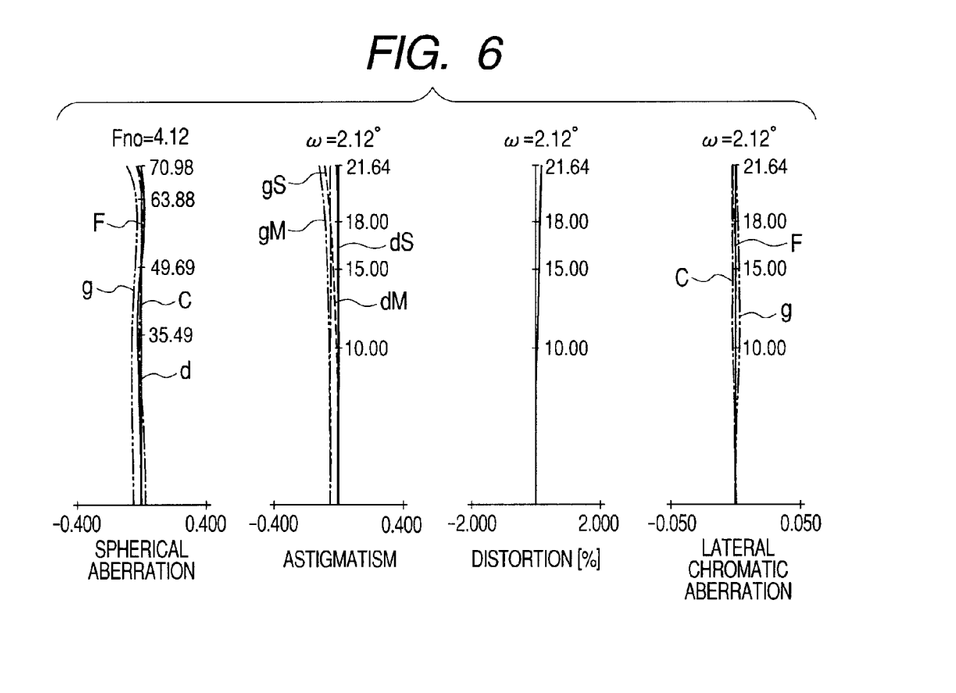
FIG. 6 is a diagram showing aberrations when the object distance is infinite, in the third numerical embodiment of the invention.

FIG. 1 is a cross-sectional view of a lens of an optical system according to a first embodiment of the invention. FIG. 2 is a diagram showing aberrations when the object distance is infinite, in the first embodiment of the invention. FIG. 3 is a cross-sectional view of a lens of an optical system according to a second embodiment of the invention. FIG. 4 is a diagram showing aberrations when the object distance is infinite, in the second embodiment of the invention. FIG. 5 is a cross-sectional view of a lens of an optical system according to a third embodiment of the invention. FIG. 6 is a diagram showing aberrations when the object distance is infinite, in the third embodiment of the invention.

In the cross-sectional views of the lenses, the left side is the object side (front side) and the right side is the image side (rear side). OL, LF, LR, and S denote an optical system (image taking optical system), a front unit having positive refractive power, a rear unit having positive or negative refractive power, and an aperture stop, respectively. IP denotes an image surface that corresponds to an image taking surface of a solid-state image sensor (photoelectric conversion element), such as a CCD sensor or a CMOS sensor, when the optical system is used as an image taking optical system of a video camera Or a digital still camera and corresponds to a photosensitive surface, such as a film surface, when the optical system is used as a camera for a silver halide film. In the diagrams showing the aberrations, d, g, C, and F denote a d-line, a g-line, a C-line, and an F-line, respectively. dS and dM denote a sagittal image surface and a meridional image surface of the d-line, respectively, and gS and gM denote a sagittal image surface and a meridional image surface of the g-line, respectively. Lateral chromatic aberrations are represented by the g-line, the F-line, and the C-line. Further, G denotes a glass block, such as an optical filter or a faceplate. In this embodiment, it is assumed that the glass block G is not included in the rear unit LR. In this embodiment, a back focus indicates the distance from a last lens surface Re of a last lens of the rear unit LR closest to the image side to the image surface IP, in a state where the glass block G does not present.

A partial dispersion ratio and an Abbe number of a material of the lens that is used in the image taking optical system according to this embodiment are as follows. That is, when refractive indexes of Fraunhofer lines with respect to the g-line (wavelength of 435.8 nm), the F-line (wavelength of 486.1 nm), the d-line (wavelength of 587.6 nm), and the C-line (wavelength of 656.3 nm) are defined as Ng, NF, Nd, and NC, respectively; the Abbe number vd and the partial dispersion ratio θgF of the material with respect to the g-line and the F-line is represented by the following conditional equations.

$$vd=(Nd-1)/(NF-NC)$$

$$\theta gF=(Ng-NF)/(NF-NC)$$

At this time, a material that satisfies a condition $\theta gF-0.6438+0.001682\times vd>0.02$ is called an "anomalous partial dispersion material".

The optical system according to each embodiment is used in an image taking apparatus, such as a digital camera, a video camera, and a camera for a silver halide film, an observation apparatus, such as a telescope and binoculars, and an optical apparatus, such as a projector.

Next, an aberration correction principle that is associated with the optical system according to the invention will be described. In general, in a telescopic lens, the positive refractive power of the front unit is increased to decrease the entire lens length and the effective diameter of the front lens. However, if the positive refractive power is increased, it becomes difficult to obtain high optical performance, because a longitudinal chromatic aberration and a lateral chromatic aberration are greatly generated.

In the telescopic lens that is disclosed in Japanese Patent Application Laid-Open No. 2008-145584 or U.S. Pat. No. 6,239,919, a lens that is formed of a material, such as fluorite, having low dispersion and anomalous partial dispersion, is used in the front unit having the positive refractive power where both of the incident height of an on-axis ray and the incident height of an off-axis principal ray are large. That is, with such a structure, even though the positive refractive power of the front unit is increased to some degree, the longitudinal chromatic aberration and the lateral chromatic aberration are to be satisfactorily corrected. However, the increase of the positive refractive power of the front unit must be restricted to some degree in order to satisfactorily correct both of the longitudinal chromatic aberration and the lateral chromatic aberration. That is, it is tough to sufficiently increase the positive refractive power.

In the telescopic lens that is disclosed in U.S. Pat. No. 7,538,957, a material, such as fluorite, which has a low refractive index and low dispersion and anomalous partial dispersion, is used in a negative lens of a third lens unit where the incident height of an on-axis ray is small and the incident height of an off-axis principal ray is large. Thereby, a lateral chromatic aberration of the g-line is effectively corrected. However, in the negative lens that is formed of the material having the low refractive index and the low dispersion, a correction effect of image surface curvature or astigmatism and lateral chromatic aberrations of the C-line and the F-line is not sufficient. For this reason, it is difficult to sufficiently increase the refractive power of the front unit.

Meanwhile, in this embodiment, a negative lens Gn1 that is formed of a material having a high refractive index, high dispersion, and anomalous partial dispersion is disposed in the rear unit LR. With such a structure, a correction effect of the lateral chromatic aberration, the image surface curvature, and the astigmatism can be sufficiently obtained in the rear unit LR. Therefore, the positive refractive power of the front unit LF can be sufficiently increased and the entire lens length or the effective diameter of the front lens can be decreased.

Next, each embodiment of the optical system (image taking optical system) according to the invention will be described. In the optical system according to the invention, by using a positive lens Gp1 formed of a material having anomalous partial dispersion as an object side lens of the front unit LF where the incident height of the on-axis ray is large, the longitudinal chromatic aberration is corrected.

Specifically, when an Abbe number of a material of the positive lens Gp1 with respect to the d-line is defined as vdp1 and the partial dispersion ratio of the material with respect to the g-line and the F-line is defined as θgFp1, the following conditional equations (1) and (2) are satisfied.

$$75<vdp1<99 \quad (1)$$

$$0.020<\theta gFp1-0.6438+0.001682\times vdp1<0.100 \quad (2)$$

If a value exceeds an upper limit of the conditional equation (1), it is difficult to obtain a material which is easy to process, and the material is restricted to a material, such as a resin material which is difficult to process. For this reason, from the viewpoint of productivity, it is difficult to stably provide superior optical performance required in the telescopic lens. If the value is below a lower limit of the conditional equation (1), the longitudinal chromatic aberrations of the C-line and the F-line are excessively generated. For this reason, it is needed to decrease the refractive power of the positive lens Gp1, which leads to the increase in the entire lens length and the effective diameter of the front lens.

If a value exceeds an upper limit of the conditional equation (2), it is difficult to obtain a material which is easy to process, and the material is restricted to a material, such as a resin material which is difficult to process. For this reason, from the viewpoint of productivity, it is difficult to stably provide superior optical performance required in the telescopic lens. If the value is below a lower limit of the conditional equation (2), the longitudinal chromatic aberration of the g-line is insufficiently generated. For this reason, it becomes difficult to obtain a superior chromatic aberration characteristic.

Further, numerical ranges of the conditional equations (1) and (2) are preferably set to meet the following:

$$80<vdp1<97 \quad (1a)$$

$$0.025<\theta gFp1-0.6438+0.001682\times vdp1<0.080 \quad (2a)$$

In the invention, an anomalous partial dispersion material that has a high refractive index and high dispersion is used in the negative lens of the image surface side of the rear unit where the incident height of the on-axis ray is small and the incident height of the off-axis principal ray is large. Thereby, the lateral chromatic aberration, the image surface curvature, and the astigmatism are satisfactorily corrected.

Specifically, when a refractive index and an Abbe number of the material of the negative lens Gn1 are defined as Ndn1 and vdn1, respectively, and the partial dispersion ratio of the material with respect to the g-line and the F-line is defined as θgFn1, the following conditional equations (3) and (4) are satisfied.

$$1.75 < Ndn1 < 2.10 \quad (3)$$

$$0.020 < \theta gFn1 - 0.6438 + 0.001682 \times vdn1 < 0.100 \quad (4)$$

If a value exceeds than an upper limit of the conditional equation (3), it is difficult to obtain a material which is easy to process, and the material is restricted to a material, such as a resin material, which is difficult to process. For this reason, from the viewpoint of productivity, it becomes difficult to stably provide superior optical performance required in the telescopic lens. If the value is below a lower limit of the conditional equation (3), since the correction of the image surface curvature and the astigmatism is insufficient, it is needed to decrease the positive refractive power of the front unit, which may result in the increase in the entire lens length and the effective diameter of the front lens.

If a value exceeds an upper limit of the conditional equation (4), it is difficult to obtain a material which is easy to process, and the material is restricted to a material, such as a resin material, which is difficult to process. For this reason, from the viewpoint of productivity, it becomes difficult to stably provide superior optical performance required in the telescopic lens. If the value is below a lower limit of the conditional equation (4), the lateral chromatic aberration of the g-line is insufficiently generated. For this reason, it becomes difficult to obtain superior optical performance.

Further, numerical ranges of the conditional equations (3) and (4) may be set as represented by the following conditional equations.

$$1.80 < Ndn1 < 2.00 \quad (3a)$$

$$0.023 < \theta gFn1 - 0.6438 + 0.001682 \times vdn1 < 0.070 \quad (4a)$$

In the invention, the various aberrations including the chromatic aberration are satisfactorily corrected using the method described above, and the image taking optical system with a small size and light weight is obtained. Next, preferable conditions that are needed to more effectively obtain an optical system that has a small size, light weight, and superior optical performance will be described.

In the invention, when the distance from the aperture stop S to the lens surface Re of the rear unit LR closest to the image side is defined as L, the negative lens Gn1 of the rear unit LR is disposed in a state where the distance from the aperture stop S is between 0.5 L and 1.0 L. Thereby, the lateral chromatic aberration is satisfactorily corrected.

In this case, the disposing of the negative lens Gn1 in a state where the distance from the aperture stop is between 0.5 L and 1.0 L means that the entire negative lens Gn1 is disposed within the range of the distance.

When the negative lens Gn1 of the rear unit LR is disposed at the position where the distance from the aperture stop S is shorter than 0.5 L, the incident height of the off-axis principal ray decreases. As a result, it becomes difficult to obtain a superior correction effect of the lateral chromatic aberration. Since the incident height of the on-axis ray increases and the longitudinal chromatic aberration of the g-line is excessively corrected, this is not preferable.

The rear unit LR preferably has at least one positive lens Gp2. When a refractive index and an Abbe number of a material of the positive lens Gp2 with respect to the d-line are defined as Ndp2 and vdp2, respectively, and the partial dispersion ratio of the material with respect to the g-line and the F-line is defined as θgFp2, at least one of the following conditional equations (5) and (6) may be satisfied. Thereby, the lateral chromatic aberration is satisfactorily corrected.

$$1.90 < Ndp2 + 0.0125vdp2 < 2.24 \quad (5)$$

$$-0.010 < \theta gFp2 - 0.6438 + 0.001682 \times vdp2 < 0.003 \quad (6)$$

If a value exceeds an upper limit of the conditional equation (5), the image surface curvature and the astigmatism are excessively corrected when the refractive index Ndp2 is large and correction of the lateral chromatic aberrations of the C-line and the F-line becomes insufficient when the Abbe number vdp2 is large. For this reason, it becomes difficult to obtain superior optical performance. If the value is below a lower limit of the conditional equation (5), it is difficult to obtain a material which is easy to process, and the material is restricted to a material, such as a resin material, which is difficult to process. For this reason, from the viewpoint of productivity, it becomes difficult to stably provide superior optical performance required in the telescopic lens.

If a value exceeds an upper limit of the conditional equation (6), the lateral chromatic aberration of the g-line is excessively corrected, and the correction effect of the lateral chromatic aberration that is obtained by the negative lens Gn1 of the rear unit LR may be cancelled. If the value is below a lower limit of the conditional equation (6), it is difficult to obtain a material that satisfies the conditional equation (5), and the material is restricted to a material, such as a resin material, which is difficult to process. For this reason, from the viewpoint of productivity, it becomes difficult to stably provide superior optical performance.

Further, numerical ranges of the conditional equations (5) and (6) may be preferably set as represented by the following conditional equations.

$$2.00 < Ndp2 + 0.0125vdp2 < 2.20 \quad (5a)$$

$$-0.008 < \theta gFp2 - 0.6438 + 0.001682 \times vdp2 < 0.001 \quad (6a)$$

The positive lens Gp2 is disposed in a state where the distance from the aperture stop S is between 0.5 L and 1.0 L. Thereby, the lateral chromatic aberration is satisfactorily corrected.

When the positive lens Gp2 of the rear unit LR is disposed at the position where the distance from the aperture stop S is shorter than 0.5 L, the incident height of the off-axis principal ray decreases. As a result, it becomes difficult to obtain a superior correction effect of the lateral chromatic aberration. Since the incident height of the on-axis ray increases and the longitudinal chromatic aberration of the g-line is insufficiently generated, this is not preferable.

In the invention, the positive lens Gp2 of the rear unit LR uses a material with a niobium oxide ($Nb_2O_3$) as a principal substance. In the negative lens Gn1 of the rear unit, a material that satisfies the conditional equations (3) and (4) among materials currently available from the market, includes a material with a neptunium oxide ($NpO_2$) as a principal substance. However, in this material, transmittance of blue transmissive light is low. In general, the image taking optical system needs to maintain a color tone of the transmissive light of the optical system with a proper balance to reproduce a color.

In the invention, even though $NpO_2$ is used, the negative lens Gn1 that satisfies the conditional equations (3) and (4) is disposed on the image side of the rear unit LR of the optical system where the outer diameter is small and the central thickness can be easily decreased, to moderate a change in the color tone of the transmissive light, and the shift to the side of a yellow color is alleviated. When the material with $NpO_2$ as the principal substance is used, if the transmissive light is likely to be shifted to the side of a yellow color, the positive lens Gp2 of the rear unit LR that is formed of a high dispersion material may be used to make a color of the transmissive light of the entire optical system looks like a white color.

In general, the positive lens Gp2 of the rear unit LR that is formed of the high dispersion material has the large thickness and uses in many cases a material with titanium oxide ($TiO_2$) where transmittance of blue transmissive light is slightly low as a principal substance. For this reason, the color tone of the transmissive light may be slightly shifted to the side of a yellow color. Accordingly, with use of a material of which a principle substance is $Nb_2O_3$ which does not have high dispersion as much as $TiO_2$, but has relatively high transmittance of the blue transmissive light, a change in the color tone of the entire optical system is further suppressed as compared with the case of using the material of which the principal substance is $TiO_2$. Further, since $TiO_2$ has the value exceeding the upper limit of the conditional equation (6), the lateral chromatic aberration of the g-line is excessively corrected. However, since the material with $Nb_2O_3$ as the principal substance satisfies the conditional equation (6), this is preferable, from the viewpoint of correction of the lateral chromatic aberration.

Next, the detailed configuration of the telescopic lens that is shown in the first numerical embodiment of the invention and FIG. 1 will be described. The front unit LF includes a biconvex positive lens L11, a biconvex positive lens (Gp1) L12 that satisfies the conditional equations (1) and (2), and a double-concave lens L13, which are provided in this order from the object side to the image side. The front unit LF further includes a biconvex positive lens (Gp1) L14 that satisfies the conditional equations (1) and (2), a meniscus-shaped negative lens L15, and a cemented lens L16 where a positive lens and a negative lens are bonded to each other. The longitudinal chromatic aberration is satisfactorily corrected by the positive lens L12 and the positive lens L14.

The positive lens that satisfies the conditional equations (1) and (2) is preferably disposed as the lens on the object side where the incident height of the on-axis ray is largest. However, the materials satisfying the above conditional equations, mainly include materials such as fluorite, which are prone to be damaged. Accordingly, the positive lens L11 of a material that is not easily damaged is disposed to be closest to the object side to protect a surface from the external damage. By the movement of the cemented lens L16 to the image side on the optical axis, focusing from an object at the infinite distance to an object at the close distance is performed.

Next, the rear unit LR includes a cemented lens L21 where a negative lens and a positive lens are bonded to each other, a positive lens L22, a cemented lens L23 where a positive lens and a negative lens are bonded to each other, a negative lens L24, and a positive lens L25. The rear unit LR further includes a cemented lens L26 where the positive lens Gp2 with $Nb_2O_3$ satisfying the conditional equations (5) and (6) as the principal substance and the negative lens Gn1 with $NpO_2$ satisfying the conditional equalities 3 and 4 as the principal substance are bonded to each other.

The lateral chromatic aberration is satisfactorily corrected by the cemented lens L26 which has the small incident height of the on-axis ray and the large incident height of the off-axis principal ray and are disposed to be closest to the image surface side, without giving a great influence to the longitudinal chromatic aberration. The material with $Nb_2O_3$ as the principal substance is used in the positive lens Gp2 of the cemented lens L26 where the positive lens Gp2 has a relatively thick body because the transmittance of the blue transmissive light is decreased by the negative lens Gn1 of the cemented lens L26 with $NpO_2$ as the principal substance, so that the change in the color tone of the transmissive light in the entire optical system is suppressed. The cemented lens L23 and the negative lens L24 are integrally moved to have a perpendicular component with respect to the optical axis, and the vibration is absorbed.

Next, the detailed configuration of the telescopic lens that is shown in the second numerical embodiment of the invention and FIG. 3 will be described. The front unit LF has the same configuration as that of the first numerical embodiment. The rear unit LR includes a cemented lens L21 where a negative lens and a positive lens are bonded to each other, a cemented lens L22 where a positive lens and a negative lens are bonded to each other, a negative lens L23, and a positive lens L24. The rear unit LR further includes a cemented lens L25 where the positive lens Gp2 with $Nb_2O_3$ satisfying the conditional equations (5) and (6) as the principal substance and the negative lens Gn1 with $NpO_2$ satisfying the conditional equations (3) and (4) as the principal substance are bonded to each other. The cemented lens L25 has the same effect as the cemented lens L26 according to the first numerical embodiment. The cemented lens L22 and the negative lens L23 are integrally moved to have a perpendicular component with respect to the optical axis, and the vibration is absorbed.

A telescopic lens that is shown in the third numerical embodiment and FIG. 5 has the same configuration as the second numerical embodiment but has a longer focal length.

Next, the numerical embodiments of the invention will be described. In each of the numerical embodiments, i represents order of counting from the object side. ri represents a curvature radius of an i-th optical surface, di represents an on-axis interval between an i-th surface and a (i+1)-th surface, and ndi and vdi represent a refractive index and an Abbe number of a medium between the i-surface and the (i+1)-th surface with respect to the d-line, respectively. f represents the focal length, Fno represents an F number, and ω represents a half angle of view. A relationship between the conditional equations and the various numerical values in the numerical embodiments is shown in Table 1.

First Numerical Embodiment

| i | ri | di | ndi | vdi | θgF | X | Effective diameter |
|---|---|---|---|---|---|---|---|
| 1 | 223.286 | 19.53 | 1.48749 | 70.2 | 0.5300 | 0.0043 | 136.01 |
| 2 | −402.146 | 30.62 | | | | | 135.26 |
| 3 | 136.802 | 23.53 | 1.43387 | 95.1 | 0.5373 | 0.0534 | 110.92 |
| 4 | −192.820 | 0.21 | | | | | 108.49 |
| 5 | −191.708 | 6.25 | 1.83481 | 42.7 | 0.5636 | −0.0083 | 108.21 |
| 6 | 292.480 | 36.00 | | | | | 102.34 |
| 7 | 100.415 | 16.28 | 1.43387 | 95.1 | 0.5373 | 0.0534 | 90.37 |
| 8 | −533.060 | 0.15 | | | | | 88.55 |
| 9 | 53.545 | 7.30 | 1.48749 | 70.2 | 0.5300 | 0.0043 | 74.46 |
| 10 | 44.506 | 16.34 | | | | | 66.36 |
| 11 | 1044.833 | 4.83 | 1.80518 | 25.4 | 0.6161 | 0.0150 | 64.90 |
| 12 | −167.445 | 3.20 | 1.80400 | 46.6 | 0.5572 | −0.0083 | 64.40 |
| 13 | 97.967 | 35.72 | | | | | 59.80 |
| 14 | (aperture stop) | 4.11 | | | | | 52.21 |
| 15 | 83.141 | 1.80 | 1.76182 | 26.5 | 0.6135 | 0.0143 | 50.26 |
| 16 | 40.709 | 7.41 | 1.60738 | 56.8 | 0.5483 | 0.0001 | 47.92 |
| 17 | 149.823 | 5.17 | | | | | 47.44 |

-continued

| | | | | | | | |
|---|---|---|---|---|---|---|---|
| 18 | 214.296 | 4.31 | 1.60738 | 56.8 | 0.5483 | 0.0001 | 46.00 |
| 19 | −147.734 | 9.85 | | | | | 45.64 |
| 20 | 54.689 | 5.85 | 1.84666 | 23.8 | 0.6205 | 0.0167 | 35.78 |
| 21 | −100.387 | 1.70 | 1.77250 | 49.6 | 0.5521 | −0.0083 | 35.03 |
| 22 | 30.341 | 5.72 | | | | | 30.67 |
| 23 | −93.490 | 1.80 | 1.83481 | 42.7 | 0.5636 | −0.0083 | 30.65 |
| 24 | 64.429 | 1.82 | | | | | 31.51 |
| 25 | 56.934 | 5.42 | 1.80518 | 25.4 | 0.6161 | 0.0150 | 33.67 |
| 26 | −508.641 | 4.00 | | | | | 34.00 |
| 27 | 62.952 | 7.46 | 1.65412 | 39.7 | 0.5737 | −0.0033 | 35.42 |
| 28 | −54.572 | 1.80 | 1.92286 | 18.9 | 0.6495 | 0.0375 | 35.20 |
| 29 | 290.545 | 15.00 | | | | | 35.22 |
| 30 | ∞ | 2.2 | 1.51633 | 64.14 | 0.5352 | −0.0007 | 38.00 |
| 31 | ∞ | | | | | | 38.00 | various kinds of data

| | |
|---|---|
| f | 392.16 |
| FNO | 2.90 |
| angle of view ω | 3.16 |
| image height Y' | 21.64 |
| entire length Lt | 340.01 |
| back focus | 71.10 |

* provided X = θgF − (0.6438 − 0.001682 × vd)

Second Numerical Embodiment

| i | ri | di | ndi | vdi | θgF | X | Effective diameter |
|---|---|---|---|---|---|---|---|
| 1 | 265.748 | 17.78 | 1.48749 | 70.2 | 0.5300 | 0.0043 | 137.22 |
| 2 | −420.408 | 48.08 | | | | | 136.43 |
| 3 | 143.732 | 21.90 | 1.43387 | 95.1 | 0.5373 | 0.0534 | 107.41 |
| 4 | −188.181 | 0.28 | | | | | 105.24 |
| 5 | −185.302 | 6.25 | 1.83481 | 42.7 | 0.5636 | −0.0083 | 105.00 |
| 6 | 302.552 | 49.95 | | | | | 100.22 |
| 7 | 108.673 | 15.80 | 1.43387 | 95.1 | 0.5373 | 0.0534 | 88.96 |
| 8 | −359.764 | 0.15 | | | | | 87.50 |
| 9 | 54.299 | 7.30 | 1.48749 | 70.2 | 0.5300 | 0.0043 | 74.76 |
| 10 | 45.818 | 16.22 | | | | | 67.81 |
| 11 | 420.291 | 4.26 | 1.80518 | 25.4 | 0.6161 | 0.0150 | 64.90 |
| 12 | −344.747 | 3.20 | 1.80400 | 46.6 | 0.5572 | −0.0083 | 64.27 |
| 13 | 111.419 | 43.73 | | | | | 60.52 |
| 14 | (aperture stop) | 6.55 | | | | | 48.31 |
| 15 | 185.602 | 1.80 | 1.72825 | 28.5 | 0.6077 | 0.0117 | 48.03 |
| 16 | 37.424 | 10.89 | 1.70154 | 41.2 | 0.5766 | 0.0021 | 46.28 |
| 17 | −170.826 | 5.53 | | | | | 46.03 |
| 18 | 53.602 | 7.30 | 1.84666 | 23.8 | 0.6205 | 0.0167 | 40.07 |
| 19 | −85.053 | 1.70 | 1.80610 | 40.9 | 0.5701 | −0.0048 | 39.34 |
| 20 | 32.935 | 6.65 | | | | | 33.42 |
| 21 | −65.258 | 1.80 | 1.83481 | 42.7 | 0.5636 | −0.0083 | 33.44 |
| 22 | 121.680 | 4.63 | | | | | 33.77 |
| 23 | 72.705 | 6.32 | 1.64769 | 33.8 | 0.5939 | 0.0069 | 36.59 |
| 24 | −125.549 | 0.20 | | | | | 37.06 |
| 25 | 92.173 | 10.46 | 1.65412 | 39.7 | 0.5737 | −0.0033 | 37.43 |
| 26 | −43.681 | 1.80 | 1.80810 | 22.8 | 0.6307 | 0.0251 | 36.98 |
| 27 | 261.177 | 15.00 | | | | | 36.91 |
| 28 | ∞ | 2.2 | 1.51633 | 64.14 | 0.5352 | −0.0007 | 36.00 |
| 29 | ∞ | | | | | | 36.00 | various kinds of data

| | |
|---|---|
| f | 392.15 |
| FNO | 2.90 |
| angle of view ω | 3.16 |
| image height Y' | 21.64 |
| entire length Lt | 372.00 |
| back focus | 70.72 |

* provided X = θgF − (0.6438 − 0.001682 × vd)

Third Numerical Embodiment

| i | ri | di | ndi | vdi | θgF | X | Effective diameter |
|---|---|---|---|---|---|---|---|
| 1 | 397.272 | 16.59 | 1.48749 | 70.2 | 0.5300 | 0.0043 | 45.69 |
| 2 | −459.269 | 46.56 | | | | | 145.07 |
| 3 | 134.301 | 20.85 | 1.43387 | 95.1 | 0.5373 | 0.0534 | 119.47 |
| 4 | −455.465 | 1.40 | | | | | 117.80 |
| 5 | −392.780 | 5.90 | 1.83481 | 42.7 | 0.5636 | −0.0083 | 116.96 |
| 6 | 269.463 | 72.58 | | | | | 111.63 |
| 7 | 105.274 | 15.06 | 1.43387 | 95.1 | 0.5373 | 0.0534 | 93.29 |
| 8 | −1104.290 | 0.15 | | | | | 91.84 |
| 9 | 63.925 | 5.00 | 1.48749 | 70.2 | 0.5300 | 0.0043 | 80.77 |
| 10 | 52.819 | 31.84 | | | | | 74.75 |
| 11 | 413.496 | 5.41 | 1.80518 | 25.4 | 0.6161 | 0.0150 | 64.43 |
| 12 | −200.760 | 3.30 | 1.83481 | 42.7 | 0.5636 | −0.0083 | 63.80 |
| 13 | 116.310 | 72.57 | | | | | 60.11 |
| 14 | (aperture stop) | 7.03 | | | | | 43.11 |
| 15 | 218.039 | 2.00 | 1.83400 | 37.2 | 0.5775 | −0.0038 | 41.13 |
| 16 | 53.513 | 6.10 | 1.74320 | 49.3 | 0.5530 | −0.0078 | 40.04 |
| 17 | −217.059 | 9.19 | | | | | 39.79 |
| 18 | 113.464 | 4.16 | 1.84666 | 23.8 | 0.6205 | 0.0167 | 34.24 |
| 19 | −104.968 | 1.65 | 1.72000 | 50.2 | 0.5535 | −0.0058 | 33.63 |
| 20 | 40.674 | 5.31 | | | | | 30.85 |
| 21 | −61.122 | 1.60 | 1.83400 | 37.2 | 0.5775 | −0.0038 | 30.78 |
| 22 | −130.879 | 5.61 | | | | | 31.10 |
| 23 | 71.590 | 3.26 | 1.84666 | 23.8 | 0.6205 | 0.0167 | 31.45 |
| 24 | 177.571 | 4.59 | | | | | 31.21 |
| 25 | −882.223 | 4.17 | 1.74950 | 35.3 | 0.5818 | −0.0026 | 31.01 |
| 26 | −44.263 | 1.90 | 1.92286 | 18.9 | 0.6495 | 0.0375 | 31.04 |
| 27 | −147.669 | 12.00 | | | | | 31.41 |
| 28 | ∞ | 2.00 | 1.51633 | 64.1 | 0.5352 | −0.0007 | 31.00 |
| 29 | ∞ | | | | | | 31.00 | various kinds of data

| | |
|---|---|
| f | 584.89 |
| FNO | 4.12 |
| angle of view ω | 2.12 |
| image height Y' | 21.64 |
| entire length Lt | 475.58 |
| back focus | 121.13 |

* provided X = θgF − (0.6438 − 0.001682 × vd)

TABLE 1

| Conditional equation | first embodiment | second embodiment | third embodiment |
|---|---|---|---|
| (1) | 95.1 (L12) | 95.1 (L12) | 95.1 (L12) |
| | 95.1 (L14) | 95.1 (L14) | 95.1 (L14) |
| (2) | 0.0534 (L12) | 0.0534 (L12) | 0.0534 (L12) |
| | 0.0534 (L14) | 0.0534 (L14) | 0.0534 (L14) |
| (3) | 1.92286 (L26 negative) | 1.80810 (L25 negative) | 1.92286 (L25 negative) |
| (4) | 0.0375 (L26 negative) | 0.0251 (L25 negative) | 0.0375 (L25 negative) |
| position of negative lens Gn1 satisfying conditional equations (3) and (4) | 0.864L | 0.813L | 0.893L |
| (5) | 2.15 (L26 positive) | 2.15 (L25 positive) | 2.15 (L25 positive) |
| (6) | −0.003 (L26 positive) | −0.003 (L25 positive) | −0.003 (L25 positive) |
| position of positive lens Gp2 satisfying conditional equations (5) and (6) | 0.974L | 0.973L | 0.966L |

Next, an embodiment of a single-lens reflex camera system (optical apparatus) using the optical system (image taking optical system) OL according to the invention will be described with reference to FIG. 7.

Figure 7:
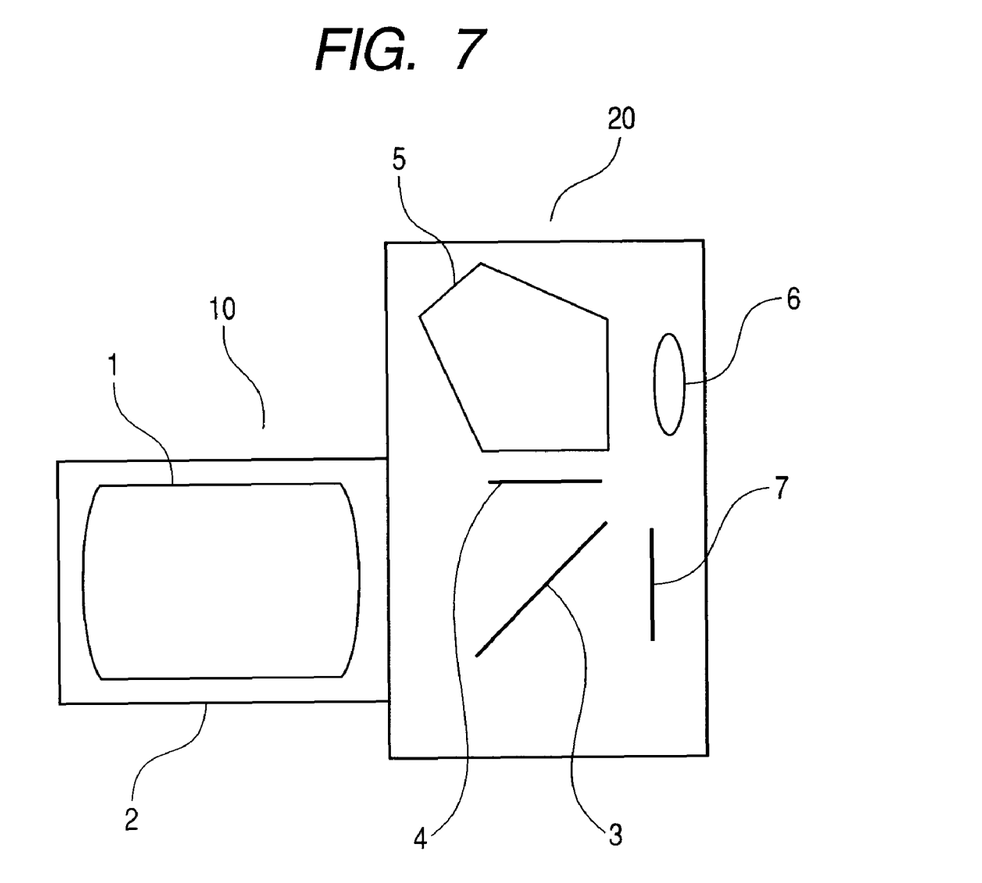
FIG. 7 is a schematic view of a main portion of an image taking apparatus according to an embodiment of the invention.

In FIG. 7, an image taking lens 10 includes the image taking optical system 1 according to the first, second, and third numerical embodiments. The image taking optical system 1 is held in a lens barrel 2 corresponding to a holding member. A camera body 20 has a quick return mirror 3 that reflects a ray from the image taking lens 10 to the upper side and a focusing plate 4 that is disposed at an image formation position of the image taking lens 10. The camera body 20 further includes a pentagonal prism 5 that converts a reverse image formed on the focusing plate 4 to an erect image and an eyepiece lens 6 that enlarges the erect image and forms an enlarged image. A photosensitive surface 7 is provided with a solid-state image sensor (photoelectric conversion element), such as a CCD sensor or a CMOS sensor, or a silver halide film on the surface thereof. At the time of taking an image, the quick return mirror 3 is retracted from an optical path, and an image is formed on the photosensitive surface 7 by the image taking lens 10. The invention can be applied to a single-lens reflex camera which does not have a quick return mirror.

While the optical system according to the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-239163, filed Oct. 16, 2009, which is hereby incorporated by reference herein in its entirety.

What is claimed is:

1. An optical system, comprising:
a front unit having positive refractive power;
an aperture stop; and
a rear unit having positive or negative refractive power, in order from an object side to an image side,
wherein the front unit has a positive lens Gp1 and the rear unit has a negative lens Gn1, and
when an Abbe number of a material of the positive lens Gp1 with respect to a d-line is defined as $\nu dp1$, a partial dispersion ratio of the material of the positive lens with respect to a g-line and an F-line is defined as $\theta gFp1$, a refractive index and an Abbe number of a material of the negative lens Gn1 with respect to a d-line are defined as $Ndn1$ and $\nu dn1$, respectively, and a partial dispersion ratio of the material of the negative lens with respect to the g-line and the F-line is defined as $\theta gFn1$, satisfying the following conditions:

$75 < \nu dp1 < 99$, $0.020 < \theta gFp1 - 0.6438 + 0.001682 \times \nu dp1 < 0.100$, $1.75 < Ndn1 < 2.10$, and $0.020 < \theta gFn1 - 0.6438 + 0.001682 \times \nu dn1 < 0.100$.

2. The optical system according to claim 1, wherein, when the distance from the aperture stop to a lens surface of the rear unit closest to the image side is defined as L, the negative lens Gn1 is disposed in a state where the distance from the aperture stop is between 0.5 L and 1.0 L.

3. The optical system according to claim 1, wherein the rear unit has at least one positive lens Gp2, and when a refractive index and an Abbe number of a material of the positive lens Gp2 with respect to the d-line are defined as $Ndp2$ and $\nu dp2$, respectively, and a partial dispersion ratio of the material of the positive lens with respect to the g-line and the F-line is defined as $\theta gFp2$, satisfying the following conditions:

$1.90 < Ndp2 + 0.0125 \nu dp2 < 2.24$ and $-0.010 < \theta gFp2 - 0.6438 + 0.001682 \times \nu dp2 < 0.003$.

4. The optical system according to claim 1, wherein, the rear unit has at least one positive lens Gp2, and when the distance from the aperture stop to a lens surface of the rear unit closest to the image side is defined as L, the positive lens Gp2 of the rear unit is disposed in a state where the distance from the aperture stop is between 0.5 L and 1.0 L.

5. An optical apparatus comprising the optical system according to claim 1.

* * * * *